United States Patent [19]

Georgiev et al.

[11] Patent Number: 4,610,264
[45] Date of Patent: Sep. 9, 1986

[54] HYDRO-AUTOMATIC VALVE FOR THE CONTROL OF BRANCHINGS OF THE DISTRIBUTION PIPING OF A SPRINKLING IRRIGATION SYSTEM ON STEEP GROUNDS

[75] Inventors: Vesselin Y. Georgiev; Vladimir S. Mednikarov, both of Sofia, Bulgaria

[73] Assignee: Institute po Mechanika I Biomechanika, Sofia, Bulgaria

[21] Appl. No.: 736,806

[22] Filed: May 22, 1985

[30] Foreign Application Priority Data

May 22, 1984 [BG] Bulgaria ................................. 65590

[51] Int. Cl.$^4$ .............................................. F16K 11/14
[52] U.S. Cl. ................................... 137/119; 137/110; 137/467; 137/630.14; 239/570; 251/63.4
[58] Field of Search ................... 137/630.14, 119, 110, 137/467; 251/63.4; 239/571, 572, 570

[56] References Cited

U.S. PATENT DOCUMENTS

| 1,937,246 | 11/1933 | Reedy | 137/467 |
| 3,119,403 | 1/1964 | Stilwell | 137/119 |
| 3,779,266 | 12/1973 | Fruth et al. | 137/110 |
| 3,797,526 | 3/1974 | Champeon | 137/630.14 |
| 3,866,629 | 2/1975 | Nicklas | 137/467 |
| 3,888,280 | 6/1975 | Tartaglia | 137/630.14 X |
| 4,254,913 | 3/1981 | Georgiev | 137/467 X |
| 4,457,340 | 7/1984 | Krueger | 251/63.4 X |

Primary Examiner—Martin P. Schwadron
Assistant Examiner—Stephen M. Hepperle

[57] ABSTRACT

A hydro-automatic valve with a cylindrical housing mounted vertically and having rigid upper and bottom ring shaped rests between which, within the cylindrical housing, interconnected upper and bottom face closure members are freely disposed. The upper face closure member is shaped as a disc with a hole in the central axis and has small legs arranged around its periphery extending vertically downwards with small teeth turned inwards towards the central axis. The small teeth are disposed freely in a shallow ring shaped groove in the surrounding surface of the bottom face closure member, which is shaped with a conical peak in the axis. At the bottom end of the bottom face closure member there is a deep ring shaped groove. This deep ring shaped groove is connected via parallel channels with the space between the upper and bottom face closure member. The cylindrical housing is connected to a centrally disposed lateral inlet hole and an outlet elbow above the upper ring shaped rest, to the basic distribution piping of the sprinkling irrigation system, and via a chamber with a lateral outlet hole, disposed underneath the bottom ring shaped rest, to the branch piping. In the bottom of the chamber, coaxial to the cylindrical housing, there is mounted a cylinder with a piston pin. The space of this cylinder underneath the piston is connected via a hole to additional control piping of the irrigation system.

6 Claims, 1 Drawing Figure

U.S. Patent  Sep. 9, 1986  4,610,264
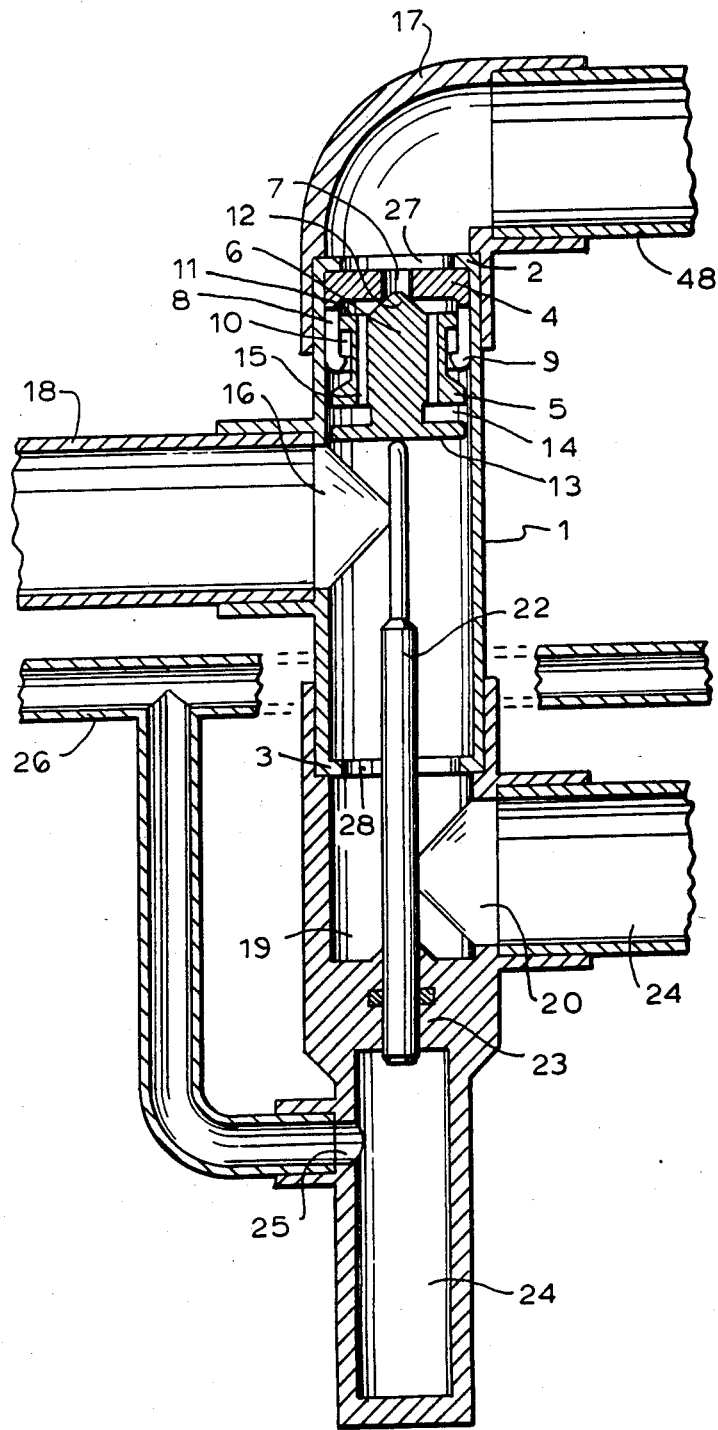

HYDRO-AUTOMATIC VALVE FOR THE CONTROL OF BRANCHINGS OF THE DISTRIBUTION PIPING OF A SPRINKLING IRRIGATION SYSTEM ON STEEP GROUNDS

BACKGROUND OF THE INVENTION

This invention relates to a hydro-automatic valve for the control of branchings of the distribution piping of a sprinkling irrigation system on steep grounds, which can be used in stationary and semi-stationary sprinkling systems for the irrigation of farm land.

A known hydro-automatic valve for controlling branches of distribution piping is described in Bulgarian Author's Certificate No. 36064. The known valve system comprises a valve disposed inside a cylindrical housing with inlet and outlet holes from and to a basic distribution piping, and an outlet hole to a branch piping, and a cylinder with a piston. The space within the cylinder underneath the piston is connected to an additional control piping of the irrigation system, while the space above the piston is connected to an air-water reservoir and, via a throttling diaphragm, to the inlet hole of the cylindrical housing. The drawbacks of the known hydro-automatic valve are: unreliable control of the valve at slow formation of the signal for reduced pressure in the inlet holes; the impossibility of switching over the valve at the presence of residual hydrostatic pressure in the inlet holes of the valve (for example as a result of the change in elevation of the ground on which the irrigation system is mounted); the complicated design of the valve due to the presence of a water-air reservoir and a throttling diaphragm; the need for purifying the water from mechanical impurities since their presence in the cylinder and throttling diaphragm causes malfunctions; and the complicated design of the slide valve, which results in increased size.

SUMMARY OF THE INVENTION

It is a general object of the present invention to develop a hydro-automatic valve for the control of branchings of the distribution piping of a sprinkling irrigation system on steep grounds, which is reliable in operation, compact and simple in design, and which can work without the need for purifying the water from mechanical impurities.

This object is achieved according to the present invention by providing a cylindrical housing mounted vertically with rigid upper and lower ring shaped rests. Within the cylindrical housing, between the rests, upper and lower face closure members are freely disposed and connected with one another. The upper face closure member is shaped as a disc with a hole in the center (axis of the cylindrical housing) and has small legs arranged around its periphery, extending vertically downward and which end with small teeth turned inwardly towards the axis. The small teeth are disposed freely in a shallow ring shaped groove in the surrounding surface of the bottom face closure member which is shaped with an upward directed conical peak in the axis. In the bottom end of the bottom face closure member, there is a deep ring shaped groove. This deep ring shaped groove is connected via parallel to the axis holes with the space between the upper and lower face closure member.

The cylindrical housing is connected via a centrally disposed lateral inlet hole and via an outlet elbow above the upper ring-shaped rest to the basic distribution piping of the sprinkling irrigation system, and via a chamber with lateral outlet holes, disposed underneath the bottom ring shaped rest, to the branch piping. In the bottom of the chamber, coaxial to the cylindrical housing, there is mounted a cylinder with a piston pin. The space of this cylinder underneath the piston is connected via a hole with the additional control piping of the irrigation system.

The external diameter of the upper face closure member and the external diameter of the bottom end of the bottom face closure member are of equal size and they are greater than the diameter of the holes of the upper and bottom ring shaped rests.

The diameter of the hole in the upper face closure member is smaller than the diameter of the basis of the conical peak of the bottom face closure member. The height of the small teeth of the upper face closure member is smaller than the height of the shallow ring shaped groove of the bottom face closure member. The distance from the upper end of the lateral inlet hole of the cylindrical housing to the upper ring shaped rest is equal to the distance from the bottom end of the hole to the bottom ring shaped rest and the total height of the upper and the bottom face closure members.

The vertical stroke of the piston pin is greater than the vertical stroke of the upper and bottom face closure members.

The advantages of the apparatus of the invention are: the reliable operation of the valve, which does not depend on the speed of formation of hydraulic control signals and on the residual hydrostatic pressure of the water in the basic piping; the compact and simplified design with a minimum number of functionally moving components; and the ability to work with water which is not purified from mechanical impurities.

BRIEF DESCRIPTION OF THE DRAWING

With these and other objects in view, which will become apparent in the following detailed description, the present invention, which is shown by example only, will be clearly understood in connection with the accompanying drawing, in which:

FIG. 1 is a diagrammatical cross-sectional view along the axis of the preferred embodiment of the hydro-automatic valve.

DETAILED DESCRIPTION OF THE DRAWING

The hydro-automatic valve, according to the invention, comprises a verticaly mounted cylindrical housing 1, in both ends of which there are rigidly fastened an upper ring shaped rest 2 and a bottom ring shaped rest 3. Ring shaped rests 2 and 3 are provided respctively with holes 27 and 28 coaxial with the axis 6 of cylindrical housing 8. Disposed between the rests 2 and 3, inside the housing 1, are floating and interconnected upper face closure member 4 and bottom face closure member 5. The upper face closure member 4 is shaped as a disc with a hole 7 coaxial to the axis 6 of the cylindrical housing 1, and around its periphery, three or four small legs 8 extend vertically downwards. At the bottom end of legs 8 are small teeth 9 which turn inwards towards the axis 6. These teeth are disposed floatingly in a shallow ring shaped groove 10 in the surrounding surface of the bottom face closure member 5. The bottom face closure member 5 is provide with a conical peak 12 in the axis of 6, while the bottom end 13 of the bottom face closure member 5 includes a deep ring shaped groove 14.

The conical peak 12 of the bottom face closure member 5 fits into the axial hole 7 of the upper face closure member such that an annular space 11 is formed between the upper face closure member 4 and the bottom face closure member 5. This annular space 11 is connected with the deep ring shaped groove 14 by holes 15 which run parallel to the central axis 6.

A lateral inlet hole 16 enters cylindrical housing 1 below the bottom face closure member 5. An outlet elbow 17 connects with cylindrical housing 1 above the upper ring shaped rest 2. The inlet hole 16 and outlet elbow 17 join basic distribution piping 18 of the irrigation system with the central housing 1. The central housing 1 is also joined, below its bottom ring shaped rest 3, to a chamber 19, which chamber is provided with a lateral outlet hole 20. Lateral outlet hole 20 is connected to the branch piping 21.

In the bottom of chamber 19, coaxial to the cylinder housing 1, there are mounted a piston pin 22 and a cylinder 23. Beneath the piston pin 22 and cylinder 23 is a space 24 which is connected via a hole 25 to additional control piping 26.

The external diameter of the upper face closure member 4 and the external diameter of the bottom end 13 of the bottom face closure member 5 are of equal size and are greater than the diameters of holes 27 and 28. The diameter of hole 7 of the upper face closure member 4 is smaller than the diameter of the basis of conical peak 12 of bottom face closure member 5. The height of the small teeth 9 of the upper face closure member 4 is smaller than the height of the shallow ring shaped groove 10 of the bottom face closure member 5. The distance from the upper end of the lateral inlet hole 16 to the upper ring shaped rest 2 is equal to the distance from the bottom end of hole 16 to the bottom ring shaped rest 3 and is also equal to the total height of upper face closure member 4 and bottom face closure member 5. The vertical stroke of the piston pin 22 is greater than the vertical stroke of the upper face closure member 4 and bottom face closure member 5.

The hydro-automatic valve operates as follows:

Hydraulic signals from reduced pressure of the water in the basic distribution piping 18 and from increased pressure in the addition control piping 26 of the irrigation system cause the piston pin 22 to move upward and push the bottom face closure member 5, and with it also the upper face closure member 4 until the later comes in contact with the upper ring shaped rest 2 and the conical peak 12 is secure in the hole 7. When hydraulic signals from the additional control piping 26 indicate reduced pressure of the water and hydraulic signals from the basic piping 18 indicate increased pressure, the piston pin 22 returns to the end bottom position, while the two face closure members 4 and 5 remain in the end upper position, maintained by the pressure of the water which passes from the housing 1 via the chamber 19 and the lateral outlet hole 20 to the branch piping 21. After the delivery of water towards the branch piping 21 has ended, a signal is formed in basic piping 18 for reduced pressure at which, initially the bottom face closure member 5 opens the hole 7 by moving downward to the small teeth 9 of the upper face closure member. The pressure of the water on both sides of the upper face closure member 4 is quickly equalized and it moves downwards together with the bottom face closure member 5, until its bottom end 13 comes in contact with the bottom ring shaped rest 3. For all following signals for increased and reduced pressure of the water in the basic piping 18, the branch piping 21 remains closed and the water flows via the housing 1 and the outlet elbow 17 to the next hydro-automatic valve and the respective branch pipings along the basic piping 18, switching them on and off successively. The return of all hydro-automatic valves simultaneously to initial position occurs after the formation of a hydraulic signal for increased pressure of water in the additional control piping 26 in coordination with a signal for reduced pressure in the basic distribution piping 18 of the irrigation system.

We claim:

1. A hydro-automatic valve for the control of water flow to branch piping of the distribution piping of a sprinkling irrigation system comprising:

a cylindrical housing with a lateral inlet hole and outlet elbow from and to a basic distribution piping and a lateral outlet hole towards the branch piping;

a cylinder with piston, wherein the space of the cylinder underneath the piston is connected to an additional control piping of the irrigation system;

wherein the cylindrical housing is mounted vertically, and in each end is provided respectively a rigid upper ring shaped rest and a rigid bottom ring shaped rest, said rests defining coaxial holes;

between said rests, inside the cylindrical housing, there are freely disposed an upper face closure member and a bottom face closure member which are interconnected;

the upper face closure member being shaped as a disc with a hole coaxial to the axis of the cylindrical housing and having, at its periphery, a plurality of small legs extending vertically downwards, which legs end in their bottom end with small teeth turned inside towards the axis;

the small legs are disposed freely in a shallow ring shaped groove in the surrounding surface of the bottom face closure member, the bottom face closure member has an upward extending conical peak coaxial to the cylindrical housing and defining an annular space between the conical peak and the upper face closure member;

at the bottom end of the bottom face closure member there is a deep ring shaped groove around its outer surface;

the deep ring shaped groove is connected to the annular space between the upper and the bottom face closure member via vertical channels parallel to the axis;

the lateral inlet hole is disposed centrally in the axis and the outlet elbow is disposed above the upper ring shaped rest;

the lateral outlet hole to the branch piping is disposed in a chamber disposed underneath the bottom ring shaped rest;

the cylinder with piston pin is mounted in the bottom of the chamber coaxial with the cylindrical housing; and the space of this cylinder underneath the piston is connected via a hole with an additional control piping of the irrigation system.

2. A hydro-automatic valve according to claim 1 wherein the external diameter of the upper face closure member and the external diameter of the bottom end of the bottom face closure member are equal in size and are greater than the diameters of the coaxial holes of the upper and bottom ring shaped rests.

3. A hydro-automatic valve according to claim 1 wherein the diameter of the hole in the upper face closure member is smaller than the diameter of the basis of the conical peak of the bottom face closure member.

4. A hydro-automatic valve according to claim 1 wherein the height of the small teeth is smaller than the height of the shallow ring shaped groove of the bottom face closure member.

5. A hydro-automatic valve according to claim 1 wherein the distance from the upper end of the lateral inlet hole of the cylindrical housing to the upper ring shaped rest is equal to the distance from the bottom end of the lateral inlet hole to the bottom ring shaped rest and equal to the distance of the total height of the upper and bottom face closure members.

6. A hydro-automatic valve according to claim 1 wherein the vertical stroke of the piston pin is greater than the vertical stroke of the upper and bottom face closure members.

* * * * *